March 11, 1969 C. A. BROWNING, JR 3,432,745
TEST CIRCUIT FOR MEASURING AND INDICATING BREAKDOWN VOLTAGE, RC
TIME CONSTANT, AND ERG DISSIPATION OF A GAS DIODE
Filed Dec. 28, 1964

INVENTOR
Charles A. Browning, Jr.

BY

ATTORNEY

United States Patent Office 3,432,745
Patented Mar. 11, 1969

3,432,745
TEST CIRCUIT FOR MEASURING AND INDICATING BREAKDOWN VOLTAGE, RC TIME CONSTANT, AND ERG DISSIPATION OF A GAS DIODE
Charles A. Browning, Jr., 9303 20th Ave., Adelphi, Md. 20783
Filed Dec. 28, 1964, Ser. No. 421,738
U.S. Cl. 324—24                                    8 Claims
Int. Cl. G01r 31/22, 15/12

ABSTRACT OF THE DISCLOSURE

A test circuit for simultaneously measuring and indicating the breakdown voltage, the RC time constant, and the erg dissipation of gas discharge diodes wherein a voltage from a charged tank condenser is applied to a test diode and a digital voltmeter registers the breakdown voltage of the test diode. A timer counts the time from the application of the voltage to the test diode to the time breakdown of the test diode occurs. A ballistic galvanometer records the erg dissipation at breakdown voltage through a simulated primer resistance of a vacuum thermocouple.

---

The invention described herein may be manufactured and used by or for the Government of the United States of America for governmental purposes without the payment of any royalties thereon or therefor.

This invention relates to measurement of gas diode characteristics and more particularly, to a test apparatus for the measurement of breakdown voltage, RC time constant and energy dissipation of gas discharge diodes used in ordnance fuzes to initiate firing primers.

In testing gas diodes for firing voltage, RC charge time, and energy dissipation it has been the general practice to obtain the characteristics from an electrostatic voltmeter, a stop watch and an oscilloscope. For complete laboratory check, the tester applied a potential to the diode from a charging circuit until the diode fired and at the same time started the stop watch. When the diode fired, the watch was stopped, the voltmeter observed for breakdown voltage, and a shutter of a camera on the oscilloscope operated to record the firing pulse for later calculation of diode erg dissipation. The reliability of this test procedure depended to a large extent on the tester's reaction time in stopping the watch, his accuracy in catching the voltmeter reading, and his operating the shutter of the camera at the proper time. Even with a highly skilled operator, the operation was not entirely satisfactory for testing a large number of diodes because the procedure with each diode was relatively time consuming.

With this invention it is possible to accurately and rapidly measure simultaneously the diode firing voltage, RC charge time, and erg dissipation by an unburdened operating procedure. The present invention contemplates a unique arrangement of simulated primer resistance, a trigger circuit for a digital voltmeter, a time counter, and a calibrated galvanometer whereby the measuring of several diode characteristics is automatic in response to the firing of a gas discharge diode being tested.

Therefore, an object of the present invention is the provision of a diode testing apparatus for measuring and indicating gas discharge diode characteristics wherein the breakdown voltage, the RC charge time, and the energy dissipation are reliably and rapidly measured, wherein measurements are conveniently and simultaneously indicated, and wherein the indications provide a direct measure of diode acceptability without further calibration.

Another object is the provision of a unique trigger circuit wherein accurate measurements of diode breakdown voltages are achieved automatically in response to the firing of a test diode.

A further object is to provide a calibration circuit for a ballistic galvanometer wherein the galvanometer can be calibrated to indicate the amount of erg dissipation of a test diode at breakdown.

Still another object is the provision of a counter timing circuit wherein the charge time for a test diode is measured automatically.

Other objects and many of the attendant advantages of this invention will be readily appreciated as the same becomes better understood by reference to the following detailed description when considered in connection with the accompanying drawings in which like reference numerals designate like parts throughout the figures thereof and wherein.

Figure 1:
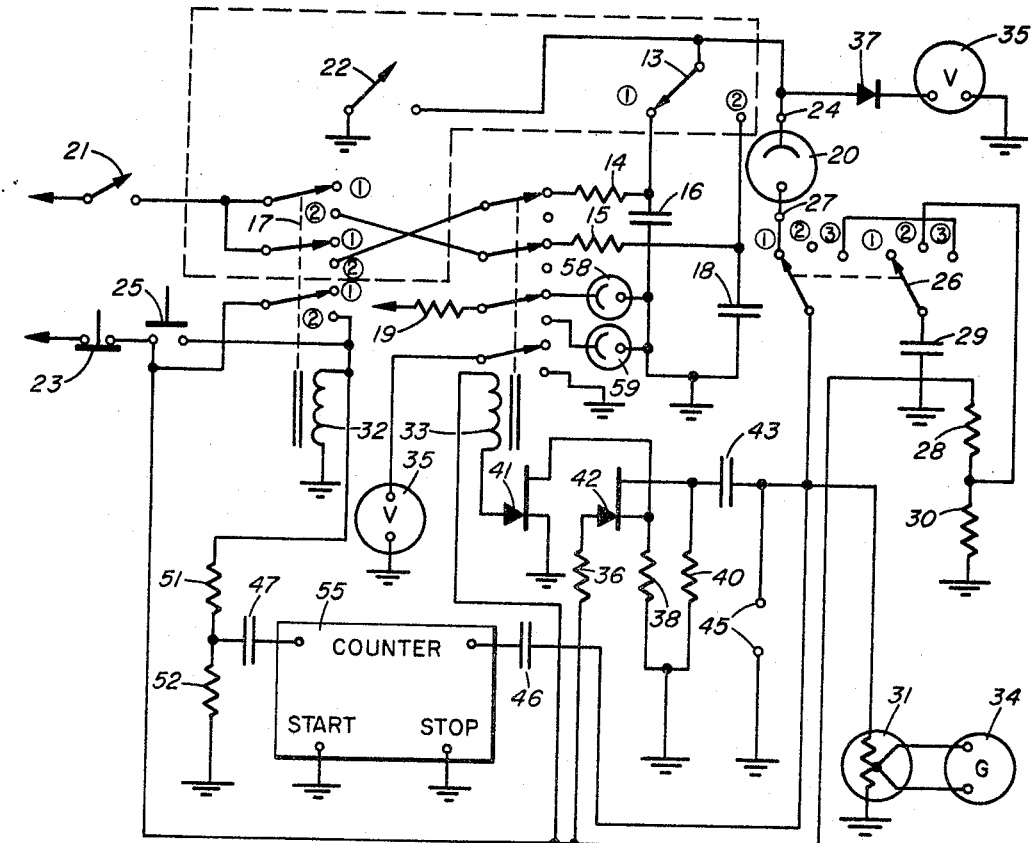
FIG. 1 shows the schematic diagram of the invention.

Referring now to FIG. 1 there is shown a circuit for simultaneous measurement of gas discharge diode breakdown voltage, RC time, and erg dissipation wherein a regulated power supply which may be 300 volts direct current is supplied to the circuit through switch 21 and a 140 volt direct current regulated power supply is supplied through push button switch 25 to relay 32. Relay 32 operates switch 17 between open position 1 and closed position 2 to connect the 300 volt power supply to either of a plurality of RC circuits preselected by switch 13. Resistor 14 with capacitor 16, and resistor 15 with capacitor 18 form RC charge time constant circuits to give the proper charging time to test diode 20. Switch 22 when closed leaves a path to ground for the discharge of either capacitor 16 or capacitor 18 after a test run depending on which RC circuit has been selected. When push button 25 is closed relay 32 also operates to keep itself closed through a contact of switch 17 in position 2. The reset button 23 opens the relay energizing circuit when a test is finished.

Figure 2:
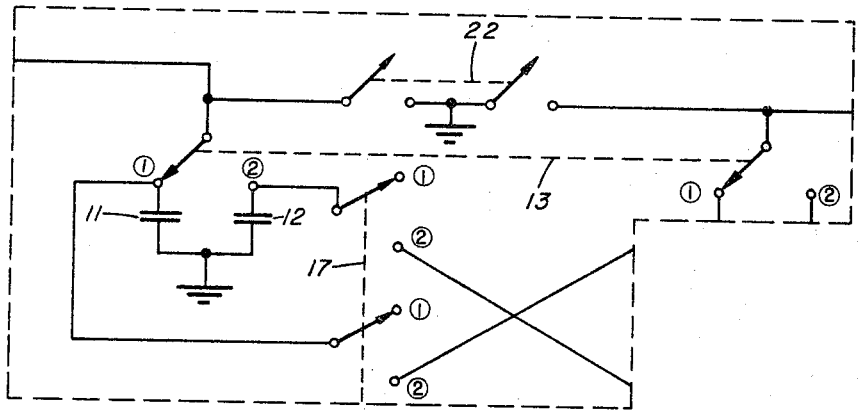
FIGURE 2 illustrates a preferred modification of the circuit shown in FIG. 1.

The circuit in FIG. 2 may be substituted for the circuit within the dotted lines in FIG. 1 when special gas discharge diodes such as those used in ordnance fuzes to initiate firing primers are to be tested. In FIG. 2 selection switch 13 connects capacitor 11 to resistor 14 and capacitor 16 when in position 1 and the second position switch 13 connects capacitor 12 with resistor 15 and capacitor 18 thereby giving the desired CRC charge time circuit.

In a normal test operation, power is supplied through switch 25 to voltage divider 51 and 52 which may be two resistors each having a value of 15K to ground. Counter 55 is connected through capacitor 47 to voltage divider 51–52 and has a start circuit completed to ground when switch 25 is closed and a stop circuit connected through capacitor 46 to the test diode which when fired completes the circuit through the stop portion of the counter.

When a sufficient charge builds up on test diode 20 to cause it to fire or breakdown, a circuit is completed through vacuum thermocouple 31 to ground. A ballistic galvanometer 34 is connected to the thermocouple 31 and calibrated to read the energy dissipation of the diode at breakdown in ergs. When a diode is being tested calibration switch 26 is in operation position 1, but may be switched to charge position 2 and calibrate position 3 when calibration of the ballistic galvanometer is desired. In position 2 capacitor 29 is charged to a value equal to the voltage drop across resistor 30 which may be 31.6 volts D.C. for a resistance of 90 ohms in resistor 30. Resistor 28, which may be 300 kilohms, connects voltage supply to capacitor 29. In position 3 capacitor 29 discharges through thermocouple 31 providing a voltage drop which corresponds to a know erg dissipation thus enabling ballistic galvanometer 34 to be calibrated.

When the calibration switch 26 is in the operate position a firing pulse across resistor 31 is coupled through capacitor 43 to the control electrode of silicon control rectifier 42 which acts as a trigger to the control electrode of silicon controlled rectifier 41 to operate relay 33. The anode and control electrodes of rectifier 42 are connected to ground through resistors 38 and 40, respectively, and the anode of rectifier 42 is connected back to a supply source through resistor 36 while rectifier 41 has its anode connected through relay 33 back to the supply source. An oscilloscope may be connected to terminals 45 to observe the firing pulse if so desired.

The energization of relay 33 causes its contacts to open the voltage RC circuit; switch off standby light 58, which is normally on through the resistor 19 to the 300 volt supply source; turns on the diode fired lamp 59; and stops the digital voltmeter 35 to record the last voltage reading before the diode fired. Digital voltmeter 35 shown connected to the test diode 20 through a high back biased diode 37 will give a reading equal to the voltage charged across capacitor 16 or 18 which will be the voltage across the test diode just before break down.

The sequence of operation for testing a diode with the apparatus proceeds in a smiple manner. In initiating a diode test, calibration switch 26 is moved to position 1, test diode 20 is inserted between binder post 24 and 27, standby light 58 will be on, and switches 21 and 25 are closed. With the closure of switch 25, relay 32 operates, counter 55 is started, and the selected time constant circuit is connected to the test diode. When the diode fires, the counter stops, a ballistic galvanometer records the amount of energy dissipation, and a trigger circuit is operated to stop the digital voltmeter.

From the foregoing disclosure, it should now be apparent that the invention provides an accurate and efficient apparatus for measuring gas diode breakdown potential, charge time, and energy dissipation by minimizing human errors and assuring greater reliability in measurement readings.

It should be understood, of course, that the foregoing disclosure relates to only preferred embodiments of the invention and that numerous modifications or alterations may be made therein without departing from the spirit and scope of the invention as set forth in the appended claims.

What is claimed is:

1. A test circuit for simultaneously measuring gas diode firing time, breakdown voltage, and energy dissipation comprising,
    an electrical charging circuit for charging a test diode,
    potential storage means connected to said circuit in response to an initiation operation for applying potential energy to said diode until said diode conducts,
    counter means connected between said storage means and said diode circuit for measuring the length of time that potential energy is applied to said diode to render the diode conductive,
    energy responsive means connected to said diode circuit for measuring the amount of energy dissipated by said diode at breakdown in response to the firing of said diode, and
    voltage measuring means connected to said diode circuit for measuring the breakdown voltage of said diode in response to the firing of said diode.

2. A test circuit for measuring and indicating gas diode characteristics comprising
    an electrical charging circuit having a first binding terminal and a second binding terminal for connection with a test diode,
    a potential storage means connected to said circuit in response to diode test initiation operation for applying potential energy to said diode to cause said diode to conduct,
    a counter including first means connected in response to the test initiation operation between said storage means and said first terminal of said charging circuit for starting said counter, and second means connected in response to the diode conducting to said second terminal for stopping said counter, said counter means measuring and indicating the elapsed time between the initiation of a diode test operation and a breakdown of a test diode,
    a thermocouple means having a simulated primer resistance connected in series with said binding terminals, and
    a galvanometer connected to said thermocouple means for measuring and indicating the energy dissipation of said diode at the breakdown of the diode.

3. The apparatus of claim 2 further comprising a pulse responsive means connected to said primer resistance biased to conduct in response to a discharge pulse from said diode, and
    a voltage measuring means connected to said pulse responsive means for measuring and indicating the breakdown voltage of said diode.

4. The apparatus of claim 2 wherein the galvanometer is a ballistic galvanometer and said thermocouple means is a vacuum thermocouple.

5. The apparatus of claim 3 wherein said voltage measuring means is a digital voltmeter.

6. Test apparatus for measuring breakdown voltage, charge time, and energy dissipation of gas discharge diodes used in initiating firing primers in ordnance fuzes where the diode is charged from a potential energy source until it reaches breakdown potential comprising,
    a plurality of charging capacitors with a selected one of said charging capacitors charged to a predetermined value,
    a plurality of resistor capacitor networks,
    a start relay and a stop relay, each relay having an energizing winding and a plurality of sets of contacts, said start relay operable when energized to connect said selected charged capacitor through one set of contacts in a tank circuit configuration with a selected one of said networks,
    said start relay operable through another set of contacts to maintain said start relay in an energized condition,
    said stop relay operable through one set of contacts to disconnect the selected charge capacitor from the selected resistor capacitor network in response to the stop relay winding being energized by a trigger pulse indicating breakdown of said test diode,
    first and second diode terminals for the insertion of a test gas discharge diode therebetween, said first terminal connected to the resistor and capacitor network,
    a simulated primer resistance connected between said second diode terminal and ground for dissipation of a discharge pulse from said diode when breakdown occurs,
    first output terminals connected to said primer resistance for providing energy dissipation measurement signals,
    a trigger circuit including series connected first and second silicon controlled rectifiers each having anode, cathode, and control electrodes, the control electrodes of said first rectifier being coupled to said second diode terminal and said primer resistance, the anode electrode of said first rectifier being connected to the control electrode of said second rectifier, and the anode electrode of said second rectifier connected to said energizing winding of the stop relay, second output terminals connected to another set of contacts of said stop relay for providing diode breakdown voltage measurement signals, whereby the breakdown voltage and energy dissipation of a gas discharge diode are measured automatically in response to the firing of said diode.

7. The apparatus of claim 6 further comprising a timer start circuit connected to said operate switch and a timer stop circuit connected to said second diode terminal and said primer resistance for measuring the charge time for a gas discharge.

8. The apparatus of claim 6 further comprising a standby lamp and a diode fired lamp, said standby lamp being switched to off and said diode fired lamp being switched on by said relay in response to said trigger pulse.

References Cited

UNITED STATES PATENTS

| 2,956,223 | 10/1960 | Cass | 324—24 |
| 2,983,864 | 5/1961 | Gibson | 324—25 XR |
| 3,324,387 | 6/1967 | Brenner | 324—24 |

OTHER REFERENCES

General Electric SCR Manual (2nd Edition), December 1961, pp. 79—80.

RUDOLPH V. ROLINEC, *Primary Examiner.*

E. L. STOLARUN, *Assistant Examiner.*

U.S. Cl. X.R.

324—73